United States Patent [19]

Clark

[11] 4,124,234
[45] Nov. 7, 1978

[54] HOSE COUPLING

[75] Inventor: James B. Clark, Mantua, Ohio

[73] Assignee: Parker-Hannifin Corporation, Cleveland, Ohio

[21] Appl. No.: 798,711

[22] Filed: May 19, 1977

[51] Int. Cl.² .............................................. F16L 33/22
[52] U.S. Cl. ................................... 285/247; 285/388
[58] Field of Search ............... 285/387, 388, 247, 245, 285/321, 174

[56] References Cited

U.S. PATENT DOCUMENTS

| 2,119,520 | 6/1938 | Brokering | 85/1 K |
| 2,731,279 | 1/1956 | Main, Jr. | 285/247 X |
| 2,805,088 | 9/1957 | Cline et al. | 285/239 |
| 2,883,513 | 4/1959 | Schnabel | 285/247 X |
| 3,761,601 | 9/1973 | Kaesser et al. | 285/321 X |
| 3,891,246 | 6/1975 | Hopper | 285/354 X |

FOREIGN PATENT DOCUMENTS

| 714,762 | 9/1931 | France | 285/174 |
| 556,758 | 10/1943 | United Kingdom | 85/1 K |
| 755,118 | 8/1956 | United Kingdom | 285/388 |

Primary Examiner—Thomas F. Callaghan
Attorney, Agent, or Firm—John N. Wolfram

[57] ABSTRACT

A hose coupling subassembly comprising a nipple with an enlarged head at one end, an external thread for attaching a socket to the nipple, and a groove between the head and thread. The subassembly includes a nut with an inturned flange engageable with the head for clamping the head against a part to which the hose coupling is to be attached. The bore of the nut flange is greater in diameter than the thread so that the nut may be assembled to the nipple by sliding it over the threaded portion. The nut is retained on the nipple by a washer extending into the groove.

5 Claims, 3 Drawing Figures

5

HOSE COUPLING

BACKGROUND OF THE INVENTION

In one form of prior art hose coupling a nipple has a generally tubular exterior at one end to extend into a flexible hose, an enlarged head at the other end formed to be clamped against a part to which the hose is to be connected, a nut over the head and having an inturned flange to engage a shoulder on the head for clamping the head against the part, and has an external thread between the extension and head for threaded attachment to a socket that clamps the hose against the nipple extension. The nut flange has a bore larger than the major diameter of the external thread so that the nut may be slipped over the extension and thread of the nipple before the socket is threaded to the nipple.

In some cases the nipple is put into stock without the socket assembled thereto because the nipple may be usable with several sizes of sockets, depending on the type of hose to be used, or the socket may be of the reusable type in which it is assembled to the hose first and the nipple is then inserted into the hose and threaded to the socket. In such cases it may be desirable to have the nut assembled to the nipple while in inventory. However, with prior art couplings as just described the nut could easily separate from the nipple while the socket is not attached to the nipple. Also, when assembling the socket to the nipple the nipple and nut must be handled as a two-piece part so that care must be taken so that the nut does not separate from the nipple just prior to threading of the socket onto the nipple.

SUMMARY OF THE INVENTION

In the present invention a hose coupling nipple has a nut over and against an enlarged end of the nipple and is retained in this position by a washer that extends into a groove between the enlarged head and an externally threaded portion of the nipple to which a socket is to be threaded. The washer butts against the external thread and projects radially beyond an end surface of the nut for retaining the nut on the nipple.

With this arrangement, the nut and nipple may be stocked and handled as a one-piece subassembly until such time that the socket is to be attached to the nipple.

DETAIL DESCRIPTION

Figure 1:
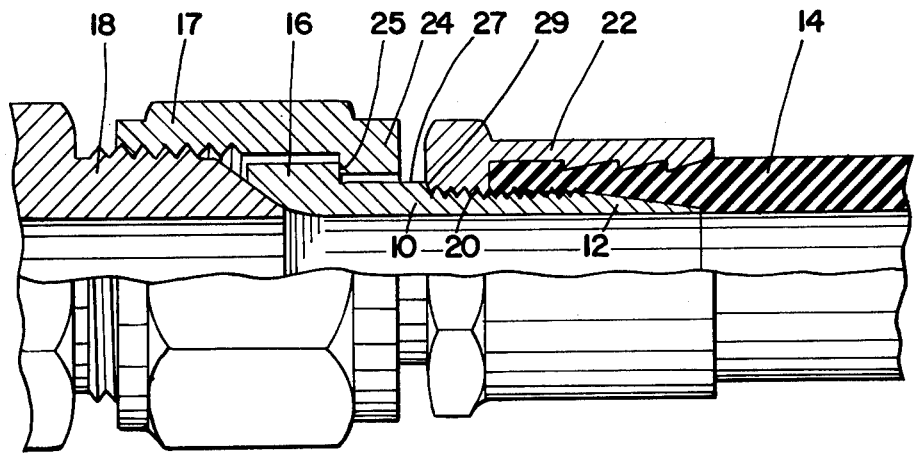
FIG. 1 is a view, partly in section, of a prior art form of hose coupling.

As shown in FIG. 1, in one form of prior hose couplings a nipple 10 has a tubular extension 12 at one end for insertion in a hose 14 and has an enlarged head 16 at the other end for clamping by means of a threaded nut 17 against a part 18 to which hose 14 is to be connected. Nipple 10 has an external thread 20 for connection to a socket 22 that grips the outer surface of hose 14 and compresses it against nipple extension 12.

Nut 17 has an inturned flange 24 to engage a transverse shoulder 25 on head 16 and the flange has a bore 26 that is larger in diameter than external thread 20 so that the nut can be slipped over extension 12 when assembling the parts to the position shown and before socket 22 is threaded onto nipple 10. When in place, socket 22 retains nut 17 on the nipple but before the socket is in place it is obvious that the nut could easily fall off the nipple during handling. This makes it inconvenient to store and/or handle the nut and nipple as a subassembly when it is not desired to mount a socket on the nipple immediately after putting the nut on the nipple.

Figure 2:
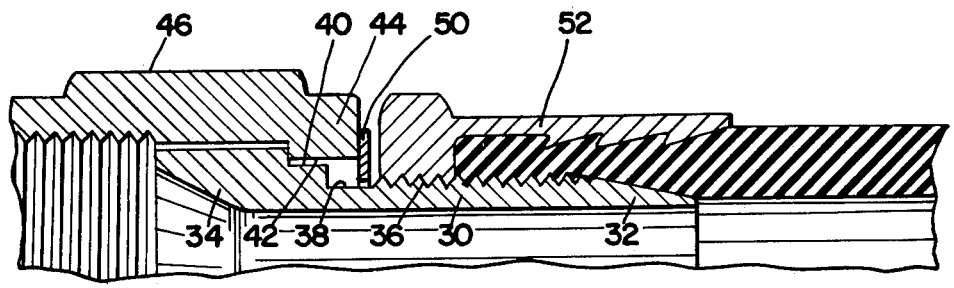
FIG. 2 is a fragmentary section view of a hose coupling with a nipple and nut subassembly in accordance with this invention.
Figure 3:
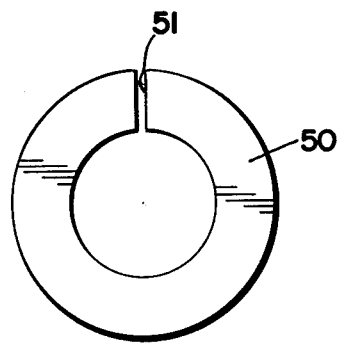
FIG. 3 is an end view of a retaining washer used in this invention.

In the present invention the nut is held in place on the nipple by a simple and cheap washer so that the nut and nipple may be handled as though they were one piece. As shown in FIG. 2, a nipple 30 has an extension 32 at one end, an enlarged head 34 at the other end and an intermediate external thread 36. Between extension 32 and head 34 is a groove 38 of a diameter approximately that of the root of thread 36. Next to groove 38 is a cylindrical portion 40 of a diameter to be a close slide fit with bore 42 of inturned flange 44 on nut 46. Bore 42 is slightly larger in diameter than the major diameter of thread 36. Mounted in groove 38 is a thin flexible washer 50 having a radial split 51 so that it may be threaded over nipple thread 36 after nut 46 has been put into place as shown by slipping it on the nipple over extension 32. Alternatively split 51 may be omitted if the washer 50 is sufficiently thin and flexible for threading over nipple thread 36 when the washer is in circumferentially continuous form. Because the inner diameter of washer 50 is less than the major diameter of thread 36 and the outer diameter of the washer is greater than the diameter of nut bore 42, the washer will retain the nut on the nipple when socket 52 is threaded onto the nipple as shown.

Thus, when the socket is not on the nipple nut 46 is retained on the nipple and this subassembly can be stored and/or handled as though it were a single piece.

In the prior art coupling of FIG. 1 nipple diameter 27 is slightly larger than the major diameter of thread 20 so that there will be a slight transverse shoulder 29 against which the socket 22 may abut to limit the amount that the socket may be threaded upon the nipple. In the coupling of FIG. 2, nipple diameter 40 is likewise larger in diameter than the major diameter of thread 36.

I claim:

1. A hose coupling subassembly comprising a nipple having an enlarged head at one end thereof, a tapered portion at the other end thereof, and an externally threaded portion adjacent one end of said tapered portion, said threaded portion being in threaded engagement with a hose socket axially spaced from said head, a groove between said head and said threaded portion, said groove being adjacent the other end of said threaded portion and having a diameter approximately equal to the root diameter of said threaded portion said head having a maximum diameter that is greater than the major diameter of said thread and having a transverse shoulder at the inner end of said head, a nut over said head and having an inturned flange with a bore therethrough that is larger in diameter than said external thread but smaller in diameter than said maximum head diameter whereby said flange is engageable with said transverse shoulder, and a flat flexible washer in said groove having an inner diameter less than the major diameter of the thread but greater than the minor diameter of the thread allowing said flexible washer to be turned on to said thread and to be advanced thereon for receipt in said groove, said flexible washer having an outer diameter greater than the diameter of said bore whereby the washer is engageable with said nut and said thread to retain the nut on said nipple.

2. The subassembly of claim 1 in which the washer is of flexible plastic.

3. The subassembly of claim 1 in which the washer is of flexible material and has a slit extending from its inner diameter to its outer diameter.

4. The subassembly of claim 1 in which said nipple has a cylindrical portion between said groove and said shoulder and of a diameter smaller than the diameter of said flange bore and larger than the diameter of said groove.

5. The subassembly of claim 1 in which said inturned flange is of an axial length less than the axial distance from said shoulder to said external thread.

* * * * *